(12) United States Patent
Chase et al.

(10) Patent No.: US 8,730,807 B2
(45) Date of Patent: *May 20, 2014

(54) SYSTEMS, METHODS, AND DEVICES FOR MONITORING NETWORKS

(75) Inventors: Christopher J. Chase, Austin, TX (US); Nicholas G. Duffield, Summit, NJ (US); Albert G. Greenberg, Summit, NJ (US); Oliver Spatscheck, Randolph, NJ (US); Jacobus E. Van der Merwe, New Providence, NJ (US); Neal Shackleton, Tierra Verde, FL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,220

(22) Filed: Jul. 19, 2012

(65) Prior Publication Data

US 2012/0281586 A1 Nov. 8, 2012

Related U.S. Application Data

(63) Continuation of application No. 11/237,553, filed on Sep. 28, 2005, now Pat. No. 8,228,818.

(60) Provisional application No. 60/695,166, filed on Jun. 29, 2005, provisional application No. 60/694,117, filed on Jun. 24, 2005.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/24* | (2006.01) |

(52) U.S. Cl.
CPC ............... *H04L 43/08* (2013.01); *H04L 41/06* (2013.01); *H04L 41/0681* (2013.01); *H04L 43/12* (2013.01); *H04L 43/14* (2013.01); *H04L 43/16* (2013.01); *H04L 41/0631* (2013.01)
USPC ........................................................ 370/232

(58) Field of Classification Search
None
See application file for complete search history.

(56) References Cited

U.S. PATENT DOCUMENTS

| | | | |
|---|---|---|---|
| 6,567,380 | B1 | 5/2003 | Chen |
| 6,584,093 | B1 | 6/2003 | Salama et al. |

(Continued)

FOREIGN PATENT DOCUMENTS

| | | |
|---|---|---|
| EP | 1580940 | 9/2005 |
| JP | 2002-252638 A | 9/2002 |

(Continued)

OTHER PUBLICATIONS

D. Turk, Configuring BGP to Block Denial-of-Service Attacks: RFC 3882, pp. 1-8, Sep. 2004.*

(Continued)

*Primary Examiner* — John Blanton
*Assistant Examiner* — Christopher Crutchfield
(74) *Attorney, Agent, or Firm* — Akerman LLP; Michael K. Dixon; Roy P. Zachariah

(57) ABSTRACT

Certain exemplary embodiments comprise a method comprising: for selected traffic that enters a backbone network via a predetermined ingress point and is addressed to a predetermined destination, via a dynamic tunnel, automatically diverting the selected traffic from the predetermined ingress point to a processing complex; and automatically forwarding the selected traffic from the processing complex toward the predetermined destination.

19 Claims, 3 Drawing Sheets

(56) References Cited

U.S. PATENT DOCUMENTS

| | | | |
|---|---|---|---|
| 6,594,268 | B1 | 7/2003 | Aukia et al. |
| 6,700,874 | B1 | 3/2004 | Takihiro et al. |
| 6,744,739 | B2 | 6/2004 | Martin |
| 6,778,498 | B2 | 8/2004 | McDysan |
| 6,826,186 | B1 | 11/2004 | Dittia et al. |
| 7,023,808 | B2 | 4/2006 | Ball et al. |
| 7,139,242 | B2 | 11/2006 | Bays |
| 7,200,120 | B1 | 4/2007 | Greenberg et al. |
| 7,260,645 | B2 | 8/2007 | Bays |
| 7,299,353 | B2 | 11/2007 | Le Pennec |
| 7,403,530 | B2 | 7/2008 | Duplaix et al. |
| 7,535,896 | B2 | 5/2009 | Jo |
| 7,584,298 | B2 | 9/2009 | Klinker et al. |
| 7,702,630 | B2 | 4/2010 | Basso et al. |
| 2002/0141378 | A1 | 10/2002 | Bays et al. |
| 2003/0026268 | A1 | 2/2003 | Navas |
| 2003/0086422 | A1 | 5/2003 | Klinker et al. |
| 2003/0174653 | A1 | 9/2003 | Basu et al. |
| 2003/0204621 | A1 * | 10/2003 | Poletto et al. ............. 709/239 |
| 2004/0068580 | A1 | 4/2004 | Jo et al. |
| 2004/0136357 | A1 | 7/2004 | Jo et al. |
| 2004/0148520 | A1 * | 7/2004 | Talpade et al. ............. 713/201 |
| 2004/0160969 | A1 | 8/2004 | Moon et al. |
| 2004/0181599 | A1 | 9/2004 | Kreusch et al. |
| 2004/0233859 | A1 | 11/2004 | Martin |
| 2005/0135256 | A1 | 6/2005 | Ball et al. |
| 2005/0235058 | A1 | 10/2005 | Rackus et al. |
| 2006/0029035 | A1 | 2/2006 | Chase et al. |

FOREIGN PATENT DOCUMENTS

| | | |
|---|---|---|
| JP | 2002-374293 A | 12/2002 |
| JP | 2003-273907 A | 9/2003 |
| WO | 02/17110 | 2/2002 |
| WO | 2004/012393 | 2/2004 |

OTHER PUBLICATIONS

Y. Afek, R. Brooks, N. Fischbach, MPLS Based Traffic Shunt, NONOG 28, pp. 1-25, Jun. 2003.*

Christos Siaterlis, Basil Maglaris and Panagiotis Roris, A novel Approach for a Distributed Denial of Service Detection Engine, Netmode Lab, pp. 1-16, Jan. 2003.*

J. Schönwälder, A. Pras and Jean-Philippe Martin-Flatin, On the Future of Internet Management Technologies, IEEE Communications Magazine, Oct. 2003, pp. 90-97.*

E. Rosen and Y. Rekhter, BGP/MPLS VPNs, Internet Engineering Task Force RFC 2547, pp. 1-25, Mar. 1999.*

V. Fuller, Classless Inter-Domain Routing (CIDR): The Internet Address Assignment and Aggregation Plan, pp. 1-27, Apr. 14, 2005.*

Rosen et al., "BGP/MPLS VPNs", Memo, Internet Engineering Task Force, Mar. 1, 1999, 26 page(s), The Internet Society, IETF.

Siaterlis et al., "A novel Approach for a Distributed Denial of Service Detection Engine," Netmode Lab, Jan. 2003, pp. 1-16.

Rekhter et al., "A Border Gateway Protocol 4 (BGP-4)," RFC 1771, Mar. 1995, pp. 1-58.

Fuller, "Classless Inter-Domain Routing (CIDR): The Internet Address Assignment and Aggregation Plan," Apr. 14, 2005, pp. 1-27.

Gleeson, "A Framework for IP Based Virtual Private Networks," RFC 2764, Feb. 2000, pp. 1-63.

Fuller, "Classless Inter-Domain Routing (CIDR): an Address Assignment and Aggregation Strategy", Sep. 1, 1993, 21 pages, IETF.

Rekhter, "Application of the Border Gateway Protocol in the Internet", Mar. 1, 1995, 20 pages, IETF.

Taesang et al., "Tunnel Management: Traffic Measurements and Status Monitoring", IETF Standard-Working-Draft, Internet Draft, Internet Engineering Task Force, Nov. 1, 2001, 10 page(s), IETF.

* cited by examiner

1000

SYSTEMS, METHODS, AND DEVICES FOR MONITORING NETWORKS

CROSS-REFERENCE TO RELATED APPLICATION

The present application is a continuation of U.S. patent application Ser. No. 11/237,553, filed on Sep. 28, 2005, which claims priority to U.S. Provisional Patent Application Ser. No. 60/695,166, filed Jun. 29, 2005 and U.S. Provisional Patent Application Ser. No. 60/694,117, filed Jun. 24, 2005, each of which are hereby incorporated by reference in their entireties.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
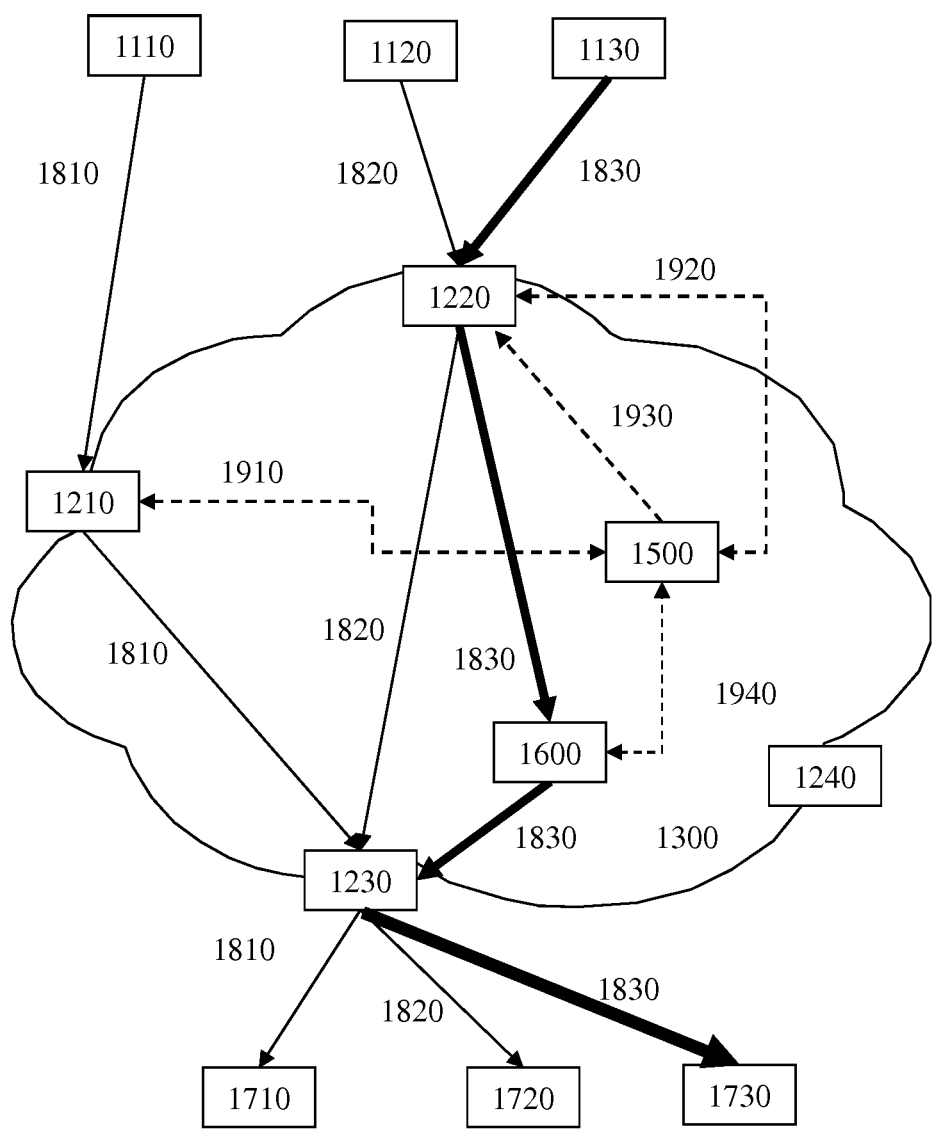
FIG. 1 is a block diagram of an exemplary embodiment of a system 1000.

This application incorporates by reference herein in its entirety, pending U.S. patent application Ser. No. 11/019,845, filed Dec. 22, 2004; and U.S. patent application Ser. No. 11/205,396, filed Aug. 17, 2005.

Certain exemplary embodiments comprise a method comprising: for selected traffic that enters a backbone network via a predetermined ingress point and is addressed to a predetermined destination, via a dynamic tunnel, automatically diverting the selected traffic from the predetermined ingress point to a processing complex; and automatically forwarding the selected traffic from the processing complex toward the predetermined destination.

Networks are widely used in today's digital world to communicate information between end systems such as users, servers, and the like. Information is usually transmitted in the form of IP (Internet Protocol) packets of digital data. Each IP packet typically has a header with the source IP address and port number, the destination IP address and port number, and other fields. The network is typically responsible for delivering the IP packets to their respective destinations. To perform this task, networks usually include routers for routing and transmitting the data packets.

A router can be connected to another router by a transmission link. The transmission link can connect a port on the first router to a port on the second router. All of the pairs of routers might not be connected and, conversely, there can be multiple links between any two given routers. A link weight can be assigned to each link automatically and/or by an administrator of the network. Each router in the network can run one or more routing protocols such as the Open Shortest Path First (OSPF) protocol or the Multiprotocol Label Switching (MPLS) protocol, or some other suitable routing protocol or combination of routing protocols. Different routing protocols can be used in different portions of the network, and any one segment can run more than one protocol.

In the MPLS protocol, each IP packet can be encapsulated in a new header or label and/or can be provided with an MPLS label ID. A sequence of label assignments, one label for each link in the path, can be used to establish an end-to-end MPLS path between routers in the network for each destination IP address. As in the case of IP networks, the path can correspond to an aggregated set of destination IP addresses, indicated by an IP address and prefix or IP address and mask. When a packet is switched from an incoming port to an outgoing port inside an MPLS network, the incoming label can be removed and/or the packet encapsulated in a new (outgoing) label.

Detailed network traffic measurement in general can be both important and expensive. Measurements in VPNs (virtual private networks) in particular can be expensive since typically expensive measurement equipment is manually and physically deployed within a particular VPN. The equipment typically deployed in such situation can reach from active probing devices such as ping probes and/or application transaction simulators to passive devices such as traffic sniffers that can measure performance and/or security properties. The cost of deploying these devices can be even further compounded by the fact that in many cases the measurements only need to be performed for and/or during short periods of time, such as when a performance and/or security problem has been noticed by a user.

Certain exemplary embodiments can provide platforms and/or methods to dynamically insert active and/or passive probes into VPNs and/or any MPLS enabled network. The platforms and/or methods can provide for:

A) mapping a measurement complex into an existing MPLS based VPN; and/or

B) diverting traffic in an MPLS enabled network through a measurement complex.

Capability A can allow active probes to be dynamically mapped into any VPN which is carried on the MPLS network. Capability B can allow the passive monitoring of every flow in the MPLS enabled network. Either or both functionalities can be provided by deploying a single (e.g., centralized) measurement complex within an entire backbone type network capable of dynamically, selectively, and/or remotely monitoring any VPN and/or other MPLS traffic when desired. Either or both features can be provided with an intelligent route service control processor (iRSCP) and/or route controller that can manipulate the distribution and/or attributes of Border Gateway Protocol (BGP) routes in an MPLS VPN environment. In an alternative realization, both features can be provided by configuration changes on the routers in the network.

To map a measurement complex into an existing VPN, the iRSCP can dynamically and/or selectively advertise routes associated with the measurement complex to be distributed to route targets (e.g., selected routers, such as a provider router, a provider edge router, a customer router, and/or a customer edge router, etc.) such that the routes can be imported into a logical table and/or the virtual routing forwarding instances (VRFs) that realize the VPN in question, potentially thereby providing an interface (and/or associating the routes and/or table with an interface) on the router coupling the measurement complex with the VPN. Addresses within the measurement complex then can become reachable within the VPN and/or addresses within the VPN then can become reachable from the measurement complex.

To facilitate passive monitoring of VPN traffic, the iRSCP can (a) cause traffic to be re-directed to the measurement complex, and (b) after passive monitoring, cause the traffic to be delivered to the original destination. The first part can be achieved by having the iRSCP advertise a more preferred and/or more specific route to the ultimate destination out of the measurement complex. This more preferred route can be advertised to a subset of routers, e.g., traffic from a single router might be re-directed, while all other routers route to the ultimate destination as per normal. In this case, since not all routers are necessarily re-directed to the measurement complex, delivering traffic to the ultimate destination after monitoring can be achieved by simply allowing the router in the measurement complex to be part of the monitored VPN and thereby allowing the router to reach destinations in the VPN, such as by forming a tunnel between the router in the measurement complex and a router intermediate to the VPN destination.

A VPN and/or a connection thereto can be logically formed on a physical network that can be and/or utilize any of a wide variety of networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone network, and/or one or more Internet service providers, and/or one or more information devices, such as a switch, router, and/or gateway not directly connected to a local area network, etc.

FIG. 1 is a block diagram of an exemplary embodiment of a system 1000, which can comprise a traffic source 1110. Traffic from traffic source 1110, 1120, 1130 can enter a backbone network 1300 via any of backbone network ingress points 1210, 1220, 1230, 1240, any of which can function also and/or instead as egress points, and any of which can be a routing entity and/or an edge router.

A route controller 1500 can be a routing peer of every routing entity within backbone network 1300, as well as every backbone network ingress point and/or egress point 1210, 1220, 1230, 1240. Thus, route controller 1500 can know of the existence and network address of each routing entity, ingress point, and egress point of backbone network 1300.

Via manipulation of a BGP route, such as via advertising a changed next hop address, prefix length, and/or local preference, route controller 1500 can cause selected traffic that enters backbone network 1300 via a predetermined ingress point 1210, 1220, 1230, 1240, to be redirected to measurement complex 1600.

Measurement complex 1600 (which can function as a processing complex and/or tool) can process the selected traffic in any of a wide variety of manners, potentially automatically, non-manually, in real-time, on demand, intermittently, dynamically, selectively, logically, remotely, and/or non-physically, etc. For example, the measurement complex can dynamically, selectively, and/or remotely measure, monitor, archive, predict, test, assess, trouble-shoot, report, adjust, correct, and/or repair, etc., the selected traffic, network utilization, congestion, protocol compliance, QOS assignments, malevolent and/or uncontrolled applications and/or processes (e.g., viruses, worms, attacks, flooding, etc.), and/or network and/or application performance, etc. As another example, route controller 1500 and/or measurement complex 1600 can dynamically insert active probes and/or passive probes into the backbone network, into a route traversed by the selected traffic, and/or into a Virtual Private Network traversed by the selected traffic. Measurement complex 1600 can process (e.g., measure, monitor, test, assess, etc., as listed above) a characteristic of at least a portion of the backbone network, a VPN established over the backbone network, and/or at least a portion of the selected traffic. The measurement complex can provide a human user interface for any of its processes and/or functions, such as its measuring, monitoring, archiving, predicting, testing, assessing, trouble-shooting, reporting, adjusting, correcting, and/or repairing, etc., processes.

Upon performing any desired processing of the selected traffic, measurement complex 1600 can automatically allow and/or cause the selected traffic to continue toward its intended destination. In certain exemplary embodiments, via its routing capabilities, measurement complex 1600 can simply automatically route the selected traffic to any routing entity on the backbone network other than the predetermined ingress point. The routing tables of such routing entities can continue to comprise a route to the intended destination of the selected traffic, and thus can automatically respond to the receipt of the selected traffic by routing that selected traffic to and/or toward the intended destination of the selected traffic. In certain exemplary embodiments, measurement complex 1600 can automatically tunnel the selected traffic to and/or toward the intended destination of the selected traffic, e.g., destination 1710 and/or 1720, such as via backbone network egress points and/or edge routers 1230 and/or 1240.

Route controller 1500, and/or measurement complex 1600 can be located within backbone network 1300 and/or can potentially automatically provide any of the herein-described functions for any amount of selected traffic, any number of traffic sources and/or identifiers, any number of backbone network ingress points, any number of backbone network egress points, any number of routing entities, and/or any number of targets and/or destinations, etc.

For example, assume that traffic 1810, which flows from and/or through source 1110 and to backbone network ingress point 1210, and is addressed to a particular target and/or destination 1710, is not of current interest to route controller 1500. Thus, although ingress point 1210 and route controller 1500 can automatically communicate via an interface, path, and/or message 1910, such as one or more BGP advertisements, there might or might not be a need for such communication regarding traffic 1810. Thus, route controller 1500 can automatically opt and/or decide to allow traffic 1810 to continue to traverse backbone network 1300 toward backbone network egress point 1230 and/or the particular target and/or destination 1710 of traffic 1810 without diversion to and/or through measurement complex 1600.

In a similar manner, assume that traffic 1820, which flows from and/or through source 1120 and to backbone network ingress point 1220, and is addressed to a particular target and/or destination 1720, is not of current interest to route controller 1500. Thus, although ingress point 1220 and route controller 1500 can communicate via an interface, path, and/or message 1920, such as one or more BGP advertisements, there might or might not be a need for such communication regarding traffic 1820. Thus, route controller 1500 can automatically opt and/or decide to allow traffic 1820 to continue to traverse backbone network 1300 toward backbone network egress point 1230 and/or the particular target and/or destination 1720 of traffic 1820 without diversion to and/or through measurement complex 1600.

Next, assume that traffic 1830, which flows from and/or through source 1130 and to backbone network ingress point 1220, and is addressed to a particular target and/or destination 1730, is of current interest to route controller 1500. Via an interface, path, and/or message 1920, such as one or more BGP advertisements, route controller 1500 can automatically divert traffic 1830 through measurement complex 1600. Once measurement complex has automatically processed traffic 1830, measurement complex can automatically send, forward, direct, and/or tunnel traffic 1830 toward backbone network egress point 1230 and/or the particular target and/or destination 1730 of traffic 1830.

Measurement complex 1600 can automatically report information to route controller 1500 via interface, path, and/or communication 1940, such that route controller 1500 can automatically cause the traffic to cease being redirected to measurement complex 1600.

Information can be automatically reported, intermittently and/or continuously, from measurement complex 1600 to route controller 1500, such as via a syslog and/or XML feed, and/or via remote procedure calls, HTTP, and/or SOAP, etc. Such information can comprise statistics determined by measurement complex 1600. Thus, somewhat similar in concept to load balancing, measurement complex 1600 and/or route controller 1500 can provide automated, adaptive, surgical, closed loop, and/or dynamic control of the type, nature, amount, and/or portion, etc., of traffic received by measurement complex 1600.

In certain exemplary embodiments, to redirect traffic 1830 from backbone network ingress point 1220 to measurement complex 1600, upon receipt of a CIDR block associated with selected traffic 1830, route controller 1500 can automatically assess an existing route and next hop for traffic 1830. Then, route controller 1500 can automatically selectively insert and/or advertise, such as via iBGP, a route to measurement complex 1600, that route comprising a longer prefix and a next hop address associated with the measurement complex. Because it has a longer prefix, the advertised route to measurement complex 1600 can be considered a more specific route. Because route controller 1500 can be automatically treated as a peer (e.g., an iBGP peer) of backbone network ingress point 1220 (and/or every other routing entity in backbone network 1300), upon receipt, backbone network ingress point 1220 can automatically install the advertised route in its route forwarding table. Because the newly installed route to the measurement complex 1600 is more specific that the existing route associated with received traffic 1830, backbone network ingress point 1220 can automatically route traffic 1830 according to the more specific route stored in its forwarding table. Thus, instead of traffic 1830 being routed to egress point 1230, traffic 1830 can be automatically redirected to measurement complex 1600.

Figure 2:
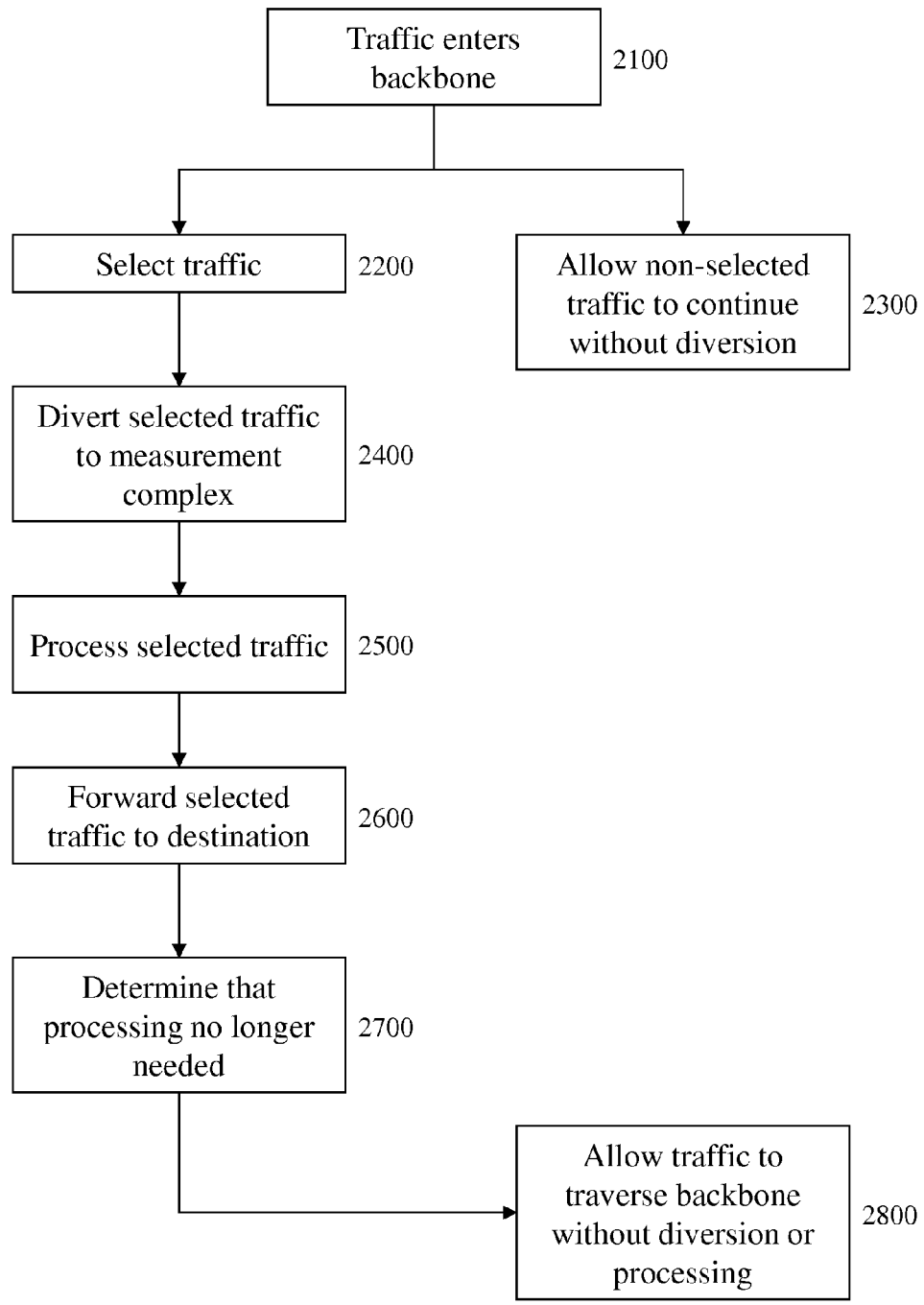
FIG. 2 is a flowchart of an exemplary embodiment of a method 2000.

FIG. 2 is a flowchart of an exemplary embodiment of a method 2000. At activity 2100, traffic can enter the backbone network, such as via an ingress point, routing entity, and/or router. At activity 2200, at least a portion of the entering traffic can be selected for processing. At activity 2300, a non-selected portion of the entering traffic can be allowed to continue to traverse the backbone network without diversion. At activity 2400, the selected traffic can be diverted, potentially by a route controller, to a measurement complex. At activity 2500, the selected traffic can be processed. At activity 2600, the processed selected traffic can be forwarded to its intended destination. At activity 2700, the measurement complex and/or the route controller can determine that processing is no longer needed for the selected traffic. At activity 2800, the selected traffic can be allowed to traverse the backbone without processing.

Figure 3:
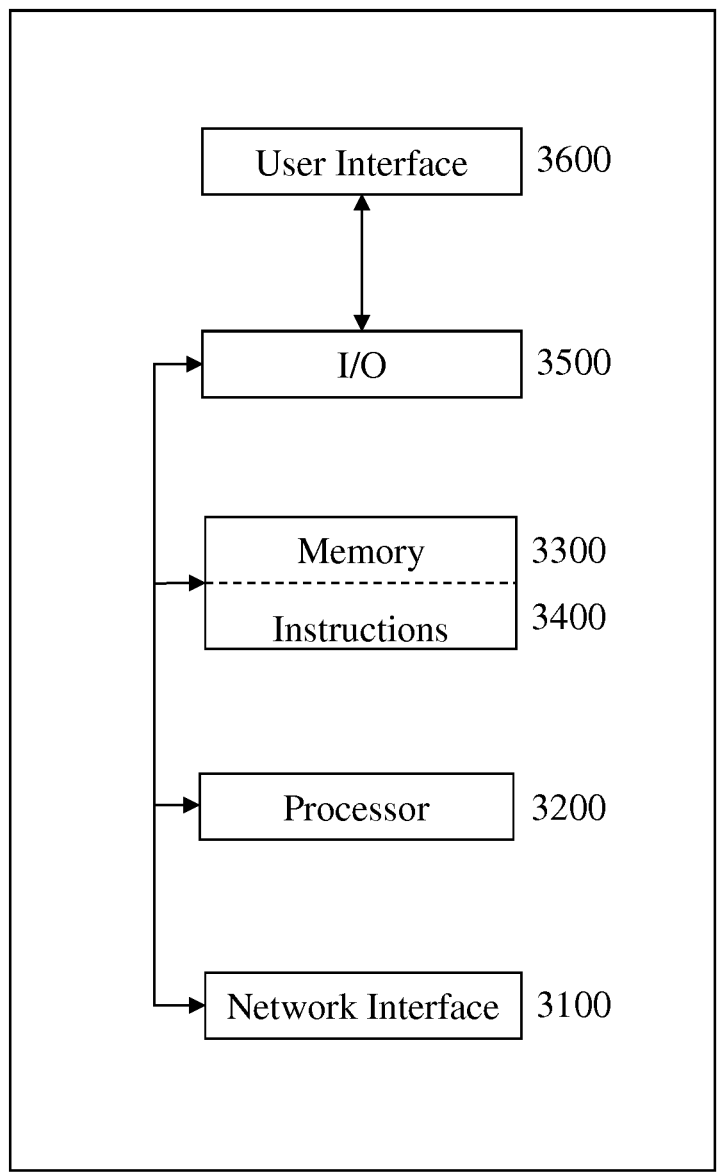
FIG. 3 is a block diagram of an exemplary embodiment of an information device 3000.

FIG. 3 is a block diagram of an exemplary embodiment of an information device 3000, which in certain operative embodiments can comprise, for example, in hardware, firmware, and/or software, source 1110-1130, ingress points 1210-1240, route controller 1500, measurement complex 1600, egress points 1210-1240, and/or destinations 1710, 1720 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user and/or administrator can view a rendering of information, such as analysis, statistics, alarms, notifications, and/or communications regarding traffic, selected traffic, a VPN, VPN traffic, a traffic source, traffic sources, targets, processing of traffic, etc.

Definitions

When the following terms are used substantively herein, the accompanying definitions apply:

a—at least one.

active—receiving and/or subjected to an action and responding and/or initiating an action in return.

activity—an action, act, step, and/or process or portion thereof.

adapted to—made suitable or fit for a specific use or situation.

advertise—to communicate a routing and/or service update comprising information regarding an aspect and/or status of a link so that other routers on a network can maintain lists of usable links and/or routes.

and/or—either in conjunction with or in alternative to.

apparatus—an appliance or device for a particular purpose.

associate—to relate, bring together in a relationship, and/or connect.

automatically—acting or operating in a manner essentially independent of external influence or control. For example, an automatic light switch can turn on upon "seeing" a person in its view, without the person manually operating the light switch.

backbone network—a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network.

BGP advertisement-generated dynamic tunnel—a tunnel that is dynamically generated from a routing entity via receipt at that routing entity of a BGP advertisement specifying an endpoint of the tunnel.

BGP route—a potential and functional path involving routing entities that utilize BGP.

Border Gateway Protocol (BGP)—a gateway path vector protocol used to exchange routing information within and/or between domains.

can—is capable of, in at least some embodiments.

carry—to transmit, convey, and/or communicate.

cause—to bring about and/or result in.

characteristic—an attribute, property, and/or metric.

comprising—including but not limited to.

couple—to link, join, and/or connect.

data—distinct pieces of information, usually formatted in a special or predetermined way and/or organized to express concepts.

define—to establish the outline, form, and/or structure of.

deploy—to distribute systematically and/or to put into action.

destination—a place and/or entity to which a transmission is ultimately directed.

device—a machine, manufacture, and/or collection thereof.

distribute—to disseminate, broadcast, and/or communicate.

distribution—a result of distributing.

divert—to distract and/or turn aside from a course and/or direction.

divert—to redirect and/or change the direction and/or route of.

dynamic—at any time and/or continuously.

form—to create and/or establish.

forward—to send on to and/or toward a subsequent destination and/or address.

Generic Route Encapsulation (GRE)—an unencrypted IP tunneling protocol, which sometimes serves as a foundation for other tunneling protocols, such as MPPE/PPTP. GRE tunnels provide a specific pathway across the shared WAN and encapsulate traffic with new packet headers to ensure delivery to specific destinations. The network is private because traffic can enter a tunnel only at an endpoint and can leave only at the other endpoint. GRE tunnels do not provide true confidentiality (like encryption does) but can carry encrypted traffic. GRE tunnels are logical endpoints configured on the physical interfaces through which traffic is carried.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

information—processed, stored, and/or transmitted data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

ingress point—a device and/or interface where traffic enters a network.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

insert—to introduce, put, and/or set into, between, and/or among traffic.

interface—(n) a boundary between two independent systems; the point at which they meet, act on, and/or communicate with each other.

intermediate—between a source and a destination.

IPSec—an Internet standard, having a tunnel mode in which it provides its own tunnels, and a transport mode, in which it provides encryption and authentication on tunnels created some other way.

label switched path (LSP)—a specific path that data follows through a mesh and/or backbone network.

Level-2 Tunnel Protocol (L2TP)—a tunneling protocol used to tunnel PPP over a public network, such as the Internet, using IP. Since the tunnel occurs on Layer 2, the upper layer protocols are ignorant of the tunnel. L2TP can also encapsulate any Layer 3 protocol.

link—a physical and/or logical communication channel between a pair of routing entities.

machine instructions—directions adapted to cause a machine to perform a particular operation or function.

machine readable medium—a physical structure from which a machine can obtain data and/or information. Examples include a memory, memory device, punch cards, bar code, etc.

manipulate—to move, arrange, operate, or control.

map—to place, join, and/or insert may—is allowed to, in at least some embodiments.

measurement complex—one or more communicatively-coupled and cooperatively-coupled performance measurement devices, tools, and/or software programs communicatively coupled to a path and/or communicatively coupled to and/or comprised by a routing entity in the path.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

monitor—to systematically check, test, and/or sample for the purpose of evaluating a statistic of a metric related to the performance of a system, network, routing entity, source, destination, etc.

MPLS traffic—traffic with which MPLS is utilized.

MPLS-enabled—an network adapted to utilized MPLS.

Multiple Protocol Label Switching (MPLS)—a standard for network communications via which an IP data stream enters the edge of the network, the ingress node reads a full address of a data packet and attaches a small "label" in the packet header, which precedes the packet. Once the "label" is added, the data stream can be routed relatively quickly to a destination node along a specific label switched path (LSP). MPLS can be particularly useful for applications that can utilize a large amount of bandwidth such as voice over IP, streaming video, streaming audio, video teleconferencing, and/or on-line games, etc.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

original destination—a place and/or entity to which a transmission is initially addressed.

packet—a discrete instance of communication.

passive—receiving and/or subjected to an action without responding and/or initiating an action in return.

path—a communicatively coupled collection of devices and links in a network.

plurality—the state of being plural and/or more than one.

portion—a part of a whole.

predetermined—established, obtained, and/or calculated in advance.

probe—one or more pre-identified and/or predetermined bits, packets, datagrams, calls, and/or messages.

process—to perform operations on data, such as to measure, monitor, archive, predict, test, assess, trouble-shoot, report, adjust, correct, and/or repair, etc.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

route—a path along which information, such as packets, can be sent.

route controller—a tool adapted to communicate selected routes to one or more routing entities using unmodified iBGP protocol. Also referred to as a Routing Control Platform (RCP).

route target—a routing entity potentially on a specific path.

routing entity—a device adapted to direct traffic. Examples include a router, route-reflector, route server, server-based router, router-switch, sets of routers, and/or intra-networking devices, etc. A typical router operates at least at the bottom 3 layers (Physical, Link, and Network layers) of the OSI model.

select—to choose.

set—a related plurality.

single—one.

specific—definite and/or explicitly set forth.

store—to place, hold, and/or retain data, typically in a memory.

subset—a set contained within a set.

substantially—to a great extent or degree.

system—a collection of mechanisms, devices, data, and/or instructions, the collection designed to perform one or more specific functions.

throughout—in, to, through, or during every part of.

toward—in the direction of.

traffic—a flow of bits, packets, datagrams, calls, and/or messages.

tunnel—one or more paths followed by encapsulated packets, one or more connections over which packets are exchanged which carry the data of another protocol, and/or one or more virtual encrypted connections formed between two or more systems over a network, such as a backbone network.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

Virtual Private Network (VPN)—a technique that enables IP traffic to travel securely over a public TCP/IP network by encrypting all traffic from one network to another. A VPN can use "tunneling" to encrypt all information at the IP level.

virtual routing forwarding table—a logically separate table of routes and forwarding information (such as next-hops) typically associated with a VPN and used to forward traffic to other VPN sites. A virtual routing and forwarding table of one VPN is separate from that of other VPNs and the global routing table.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

The invention claimed is:

1. A system for monitoring networks comprising:
a memory that stores instructions; and
a processor that executes the instructions to perform operations, the operations comprising:
identifying traffic entering a backbone network via a predetermined ingress point that is addressed to a predetermined destination;
determining a subset of the traffic addressed to the predetermined destination based on the subset of the traffic being associated with a multiprotocol label switching based virtual private network;
mapping a measurement complex into the virtual private network;
diverting the subset of the traffic to the measurement complex via an advertisement-generated dynamic tunnel while allowing the traffic not in the subset to proceed to the predetermined destination without diversion to the measurement complex, wherein the advertisement-generated dynamic tunnel is dynamically generated in response to performance data of interest, wherein the subset of the traffic is diverted to the measurement complex based in part on receipt of a classless inter-domain routing block associated with the subset of the traffic, and wherein the advertisement-generated dynamic tunnel is based on an intelligent route service control processor advertisement;
inserting a passive probe and an active probe into the virtual private network traversed by the subset of the traffic and into a route traversed by the subset of the traffic, wherein the mapping of the measurement complex enables the active probe to be mapped into the virtual private network and enables passive monitoring of every flow in the virtual private network;
receiving statistical information for the subset of the traffic from the measurement complex from a syslog and a remote procedure call, wherein the statistical information is utilized for setting a type and an amount of the traffic to be sent to the measurement complex; and
transmitting the subset of the traffic from the measurement complex to a routing entity associated with the backbone network, wherein the routing entity forwards the subset of the traffic to the predetermined destination.

2. The system of claim 1, wherein the operations further comprise diverting the subset of the traffic to the measurement complex by advertising a preferred route to the predetermined destination out of the measurement complex.

3. The system of claim 1, wherein the operations further comprise receiving the statistical information for the subset of the traffic from the measurement complex intermittently.

4. The system of claim 1, wherein the routing entity is not the predetermined ingress point.

5. The system of claim 1, wherein the operations further comprise diverting the subset of the traffic to the measurement complex by manipulating a border gateway protocol route by advertising one of a changed next hop address, a changed prefix length, and a change local preference.

6. The system of claim 1, wherein the measurement complex transmits a signal to the electronic processor to cause the electronic processor to prevent the subset of the traffic from being diverted to the measurement complex.

7. The system of claim 1, wherein the operations further comprise receiving the statistical information for the subset of the traffic from the measurement complex via an extensible markup language feed.

8. The system of claim 1, wherein the operations further comprise generating an interface on a router that couples the measurement complex to the multiprotocol label switching based virtual private network.

9. The system of claim 1, wherein the operations further comprise advertising routes associated with the measurement complex when mapping the measurement complex into the virtual private network.

10. The system of claim 9, wherein the routes are distributed to route targets such that the routes can be imported into a logical table.

11. A method for monitoring networks comprising:
identifying traffic entering a backbone network via a predetermined ingress point that is addressed to a predetermined destination;
determining, by utilizing instructions stored in memory and executed by a processor, a subset of the traffic addressed to the predetermined destination based on the subset of the traffic being associated with a virtual private network;

mapping a measurement complex into the virtual private network by utilizing a processor;
transmitting the subset of the traffic to the measurement complex via an advertisement-generated dynamic tunnel while allowing the traffic not in the subset to proceed to the predetermined destination without being transmitted to the measurement complex, wherein the advertisement-generated dynamic tunnel is dynamically generated in response to performance data of interest, and wherein the subset of the traffic is transmitted to the measurement complex based in part on receipt of a classless inter-domain routing block associated with the subset of the traffic;
inserting, by utilizing the processor, a passive probe and an active probe into the virtual private network traversed by the subset of the traffic and into a route traversed by the subset of the traffic, wherein the mapping of the measurement complex enables the active probe to be mapped into the virtual private network and enables passive monitoring of every flow in the virtual private network;
receiving statistical information for the subset of the traffic from the measurement complex from a syslog and a remote procedure call, wherein the statistical information is utilized for setting a type and an amount of the traffic to be sent to the measurement complex; and
transmitting the subset of the traffic from the measurement complex to a routing entity associated with the backbone network, wherein the routing entity transmits the subset of the traffic to the predetermined destination.

12. The method of claim 11, further comprising receiving the statistical information for the subset of the traffic from the measurement complex intermittently.

13. The method of claim 11, further comprising transmitting the subset of the traffic to the measurement complex by manipulating a border gateway protocol route by advertising one of a changed next hop address, a changed prefix length, and a change local preference.

14. The method of claim 11, further comprising transmitting the subset of the traffic, via an advertisement-generated dynamic tunnel, to the predetermined destination.

15. The method of claim 11, further comprising advertising routes associated with the measurement complex when mapping the measurement complex into the virtual private network, wherein the routes are distributed to route targets such that the routes can be imported into a logical table.

16. The method of claim 11, further comprising generating an interface on a router that couples the measurement complex to the virtual private network.

17. The method of claim 11, wherein the virtual private network is based on multiprotocol label switching.

18. The method of claim 11, further comprising advertising a preferred route to the measurement complex that comprises a longer prefix than any route determined by the predetermined ingress point in communication with the backbone network.

19. A computer-readable device comprising instructions, which when loaded and executed by a processor, cause the processor to perform operations comprising:
identifying traffic entering a backbone network via a predetermined ingress point that is addressed to a predetermined destination;
determining a subset of the traffic addressed to the predetermined destination based on the subset of the traffic being associated with a virtual private network;
mapping a measurement complex into the virtual private network by utilizing an electronic processor;
transmitting the subset of the traffic to the measurement complex via an advertisement-generated dynamic tunnel while allowing the traffic not in the subset to proceed to the predetermined destination without being transmitted to the measurement complex, wherein the advertisement-generated dynamic tunnel is dynamically generated in response to performance data of interest;
inserting, by utilizing the processor, a passive probe and an active probe into the virtual private network traversed by the subset of the traffic and into a route traversed by the subset of the traffic, wherein the mapping of the measurement complex enables the active probe to be mapped into the virtual private network and enables passive monitoring of every flow in the virtual private network;
receiving statistical information for the subset of the traffic from the measurement complex from a syslog and a remote procedure call, wherein the statistical information is utilized for setting a type and an amount of the traffic to be sent to the measurement complex; and
transmitting the subset of the traffic from the measurement complex to a routing entity associated with the backbone network, wherein the routing entity transmits the subset of the traffic to the predetermined destination.

* * * * *